US012358150B2

(12) United States Patent
Kim et al.

(10) Patent No.: US 12,358,150 B2
(45) Date of Patent: Jul. 15, 2025

(54) ROBOT AND CONTROL METHOD THEREFOR

(71) Applicant: SAMSUNG ELECTRONICS CO., LTD., Suwon-si (KR)

(72) Inventors: Hyunwoo Kim, Suwon-si (KR); Heeseung Choi, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 224 days.

(21) Appl. No.: 18/098,470

(22) Filed: Jan. 18, 2023

(65) Prior Publication Data

US 2023/0191617 A1 Jun. 22, 2023

Related U.S. Application Data

(63) Continuation of application No. PCT/KR2021/009221, filed on Jul. 19, 2021.

(30) Foreign Application Priority Data

Jul. 21, 2020 (KR) .................. 10-2020-0090404

(51) Int. Cl.
  *B25J 9/16* (2006.01)
  *B25J 15/08* (2006.01)

(52) U.S. Cl.
  CPC ........... *B25J 9/1697* (2013.01); *B25J 9/1664* (2013.01); *B25J 15/08* (2013.01)

(58) Field of Classification Search
  CPC ........ B25J 9/161; B25J 9/1612; B25J 9/1664; B25J 9/1679; B25J 15/08; B25J 19/021;
  (Continued)

(56) References Cited

U.S. PATENT DOCUMENTS 4,766,322 A * 8/1988 Hashimoto ............ B25J 19/021
                                                414/730
5,541,485 A    7/1996 Teichmann et al.
(Continued)

FOREIGN PATENT DOCUMENTS

EP     0 236 611 A1    9/1987
EP     4 140 668 A1    3/2023
(Continued)

OTHER PUBLICATIONS

N. Yamaguchi, S. Hasegawa, K. Okada and M. Inaba, "A Gripper for Object Search and Grasp Through Proximity Sensing," 2018 IEEE/RSJ International Conference on Intelligent Robots and Systems (IROS), Madrid, Spain, 2018, pp. 1-9 (Year: 2018).*
(Continued)

*Primary Examiner* — Basil T. Jos
*Assistant Examiner* — Blake A Wood
(74) *Attorney, Agent, or Firm* — Sughrue Mion, PLLC

(57) ABSTRACT

A robot includes: an arm; a hand including a first finger and a second finger, wherein the first finger includes a first sensor and the second finger includes a second sensor; and a processor configured to: based on sensing an object through the first sensor while the robot is moving to grip the object, activate the second sensor, receive, from the first sensor and the second sensor, distance information including a plurality of pairs of distance values, wherein each respective pair of distance values of the plurality of pairs of distance values includes a first distance between the first sensor and the object and a second distance between the second sensor and the object, and each respective pair of distance values corresponds to a respective position of the hand relative to the object, and control the first finger and the second finger to grip the object based on the distance information.

12 Claims, 14 Drawing Sheets

(58) Field of Classification Search
CPC ......... B25J 19/023; G05B 2219/39487; G05B 2219/39531
See application file for complete search history.

(56) References Cited

U.S. PATENT DOCUMENTS

| | | | |
|---|---|---|---|
| 8,260,458 | B2 | 9/2012 | Kim et al. |
| 9,008,841 | B2 | 4/2015 | Fuhlbrigge et al. |
| 9,089,966 | B2 | 7/2015 | Domae et al. |
| 9,120,233 | B2 | 9/2015 | Moore |
| 9,333,649 | B1 | 5/2016 | Bradski et al. |
| 10,434,652 | B2 | 10/2019 | Ando |
| 2009/0285664 | A1 | 11/2009 | Kim et al. |
| 2010/0114363 | A1* | 5/2010 | Cardoni ............. B25J 9/1612 700/218 |
| 2011/0067504 | A1* | 3/2011 | Koyama ............. G01V 11/00 901/31 |
| 2011/0128162 | A1 | 6/2011 | Klepsvik |
| 2013/0325181 | A1 | 12/2013 | Moore |
| 2018/0281200 | A1 | 10/2018 | Rosenstein et al. |
| 2019/0091875 | A1 | 3/2019 | Amacker et al. |
| 2019/0143507 | A1* | 5/2019 | Nishina ............. B25J 9/1669 700/245 |

FOREIGN PATENT DOCUMENTS

| | | |
|---|---|---|
| JP | H0947986 A | 2/1997 |
| JP | 2009066678 A | 4/2009 |
| JP | 2013248729 A | 12/2013 |
| JP | 2020009819 A | 1/2020 |
| JP | 2020049567 A | 4/2020 |
| KR | 1020090118153 A | 11/2009 |
| KR | 1020150135727 A | 12/2015 |
| KR | 1020160026032 A | 3/2016 |
| KR | 1020190070385 A | 6/2019 |
| WO | 2019176809 A1 | 9/2019 |

OTHER PUBLICATIONS

K. Hsiao, P. Nangeroni, M. Huber, A. Saxena and A. Y. Ng, "Reactive grasping using optical proximity sensors," 2009 IEEE International Conference on Robotics and Automation, Kobe, Japan, 2009, pp. 2098-2105 (Year: 2009).*

K. Sasaki, K. Koyama, A. Ming, M. Shimojo, R. Plateaux and J.-Y. Choley, "Robotic Grasping Using Proximity Sensors for Detecting both Target Object and Support Surface," 2018 IEEE/RSJ International Conference on Intelligent Robots and Systems (IROS), Madrid, Spain, 2018, pp. 2925-2932 (Year: 2018).*

Communication dated Oct. 26, 2023 issued by the European Patent Office in European Application No. 21845377.7.

International Search Report (PCT/ISA/210) issued Oct. 19, 2021 by the International Searching Authority in International Application No. PCT/KR2021/009221.

Written Opinion (PCT/IDA/237) issued Oct. 19, 2021 by the International Searching Authority in International Application No. PCT/KR2021/009221.

Hogan, F. R., et al., "Tactile Regrasp: Grasp Adjustments via Simulated Tactile Transformations", Oct. 1, 2018, 2018 IEEE/RS International Conference on Intelligent Robots and Systems (IROS), 9 pages.

International Search Report (ISA/210) issued Oct. 18, 2021 by the International Searching Authority in International Application No. PCT/KR2021/009221.

Written Opinion (ISA/237) issued Oct. 18, 2021 by the International Searching Authority in International Application No. PCT/KR2021/009221.

Communication dated Feb. 25, 2025, issued by the European Patent Office in European Application No. 21845377.7.

Communication dated Mar. 21, 2025, issued by the Korean Intellectual Property Office in Korean Application No. 10-2020-0090404.

* cited by examiner

FIG. 4

| POINT WHEREIN THE ROBOT HAND IS LOCATED | DISTANCE SENSED BY THE FIRST SENSOR (MM) | DISTANCE SENSED BY THE SECOND SENSOR (MM) |
|---|---|---|
| FIRST POINT | 100 | - |
| SECOND POINT | 100 | - |
| THIRD POINT | 97 | 97 |
| FOURTH POINT | 95 | 95 |
| FIFTH POINT | 93 | 93 |
| SIXTH POINT | 95 | 95 |

FIG. 5

| POINT WHEREIN THE ROBOT HAND IS LOCATED | DISTANCE SENSED BY THE FIRST SENSOR (MM) | DISTANCE SENSED BY THE SECOND SENSOR (MM) | SUMMED-UP DISTANCE (MM) |
|---|---|---|---|
| FIRST POINT | 100 | - | 100 |
| SECOND POINT | 100 | - | 100 |
| THIRD POINT | 97 | 97 | 194 |
| FOURTH POINT | 95 | 95 | 190 |
| FIFTH POINT | 93 | 93 | 186 |
| SIXTH POINT | 95 | 95 | 190 |

ROBOT AND CONTROL METHOD THEREFOR

CROSS-REFERENCE TO RELATED APPLICATIONS

This application is a by-pass continuation of International Application No. PCT/KR2021/009221, filed on Jul. 19, 2021, which is based on and claims priority to Korean Patent Application No. 10-2020-0090404, filed on Jul. 21, 2020, in the Korean Intellectual Property Office, the disclosures of which are incorporated by reference herein in their entireties.

BACKGROUND

1. Field

The disclosure relates to a robot and a control method therefor, and more particularly, to a robot that can grip an object, and a control method therefor.

2. Description of Related Art

As electronic technologies have advanced, various electronic devices are being developed. In particular, recently, robots performing tasks in place of humans in industrial sites, or in fields such as medicine, space, and housework, etc., are being developed.

Such robots can perform various tasks like assembly, transport, welding, etc. of an object after gripping the object (or, the article). However, when a robot grips an object, in case the robot grips the edge or the end part of the object, there is a danger such as damage, dropping, etc. of the object. Accordingly, a robot needs to grip an object on a point wherein it can grip the object most stably.

SUMMARY

Provided is a robot that can grip an object stably, and a control method therefor.

According to an aspect of the disclosure, a robot includes: an arm; a hand including a first finger and a second finger, wherein the first finger includes a first sensor and the second finger includes a second sensor; and a processor configured to: based on sensing an object through the first sensor while the robot is moving to grip the object, activate the second sensor, receive, from the first sensor and the second sensor, distance information including a plurality of pairs of distance values, wherein each respective pair of distance values of the plurality of pairs of distance values includes a first distance between the first sensor and the object and a second distance between the second sensor and the object, and each respective pair of distance values corresponds to a respective position of the hand relative to the object, and control the first finger and the second finger to grip the object based on the distance information.

The processor may be further configured to: for each respective pair of distance values of the plurality of pairs of distance values, determine a combined distance value by adding the first distance of the respective pair of distance values to the second distance of the respective pair of distance values, to obtain a plurality of combined distance values, determine a minimum combined distance value among the plurality of combined distance values, control the robot to move the hand to a position corresponding to the minimum combined distance value, and control the first finger and the second finger to grip the object.

The processor may be further configured to: based on receiving the distance information, determine a current first distance between the first sensor and the object and a current second distance between the second sensor and the object, and control at least one of the hand, the first finger, and the second finger to move such that a difference between the current first distance and the current second distance becomes less than or equal to a threshold value.

The robot may further include a drive unit, and the processor may be further configured to: based on receiving the distance information, determine a current first distance between the first sensor and the object and a current second distance between the second sensor and the object, and control the drive unit to move the robot such that a difference between the current first distance and the current second distance becomes less than or equal to a threshold value.

A first pair of distance values from among the plurality of pairs of distance values may be associated with a first point on the object, and a second pair of distance values from among the plurality of pairs of distance values may be associated with a second point on the object, the first pair of distance values and the second pair of distance values are measured while the hand moves toward the object, the first pair of distance values is measured before the second pair of distance values, and the processor may be further configured to: determine a first combined distance value based on the first pair of distance values, determine a second combined distance value based on the second pair of distance values, based on the first combined distance value being less than the second combined distance value, identify the first point on the object as a point for gripping the object, and control the first finger and the second finger to grip the object on the first point on the object.

The processor may be further configured to: based on the second combined distance value being less than the first combined distance value, control the robot to move the hand toward the object, receive a third pair of distance values from among the plurality of pairs of distance values, wherein the third pair of distance values is measured while the hand moves toward the object, is measured after the second pair of distance values, and is associated with a third point on the object, determine a third combined distance value based on the third pair of distance values from among the plurality of pairs of distance values, based on the third combined distance value being greater than the second combined distance value, identify the second point on the object as a point for gripping the object, and control the first finger and the second finger to grip the object on the second point on the object.

The first sensor may include a first light emitter and a first light sensor, and the second sensor includes a second light emitter and a second light sensor, the first sensor may be configured to emit a first light through the first light emitter, to receive through the first light sensor the first light emitted by the first light emitter which is reflected back to the first sensor, and based on a time elapsed between the first light being emitted by the first light emitter and the first light being received by the first light sensor, to determine a distance between the first sensor and the object, and the second sensor may be configured to emit a second light through the second light emitter, to receive through the second light sensor the second light emitted by the second light emitter which is reflected back to the second sensor, and based on a time elapsed between the second light being emitted by the second light emitter and the second light being received by the second light sensor, to determine a distance between the second sensor and the object.

The robot may further include a camera, and the processor may be further configured to determine a location of the object based on an image obtained by the camera, and move the robot toward the object.

According to an aspect of the disclosure, a control method for a robot including a hand, the hand including a first finger and a second finger, the first finger including a first sensor, and the second finger including a second sensor, the control method including: based on sensing an object through the first sensor while the robot is moving to grip the object, activating the second sensor; receiving, from the first sensor and the second sensor, distance information including a plurality of pairs of distance values, wherein each respective pair of distance values of the plurality of pairs of distance values includes a first distance between the first sensor and the object and a second distance between the second sensor and the object, and wherein each respective pair of distance values corresponds to a respective position of the hand relative to the object; and controlling the first finger and the second finger to grip the object based on the distance information.

The controlling may include: for each respective pair of distance values of the plurality of pairs of distance values, determining a combined distance value by adding the first distance of the respective pair of distance values to the second distance of the respective pair of distance values, to obtain a plurality of combined distance values, determining a minimum combined distance value among the plurality of combined distance values, controlling the robot to move the hand to a position corresponding to the minimum combined distance value, and controlling the first finger and the second finger to grip the object.

The control method may further include: based on receiving the distance information, determining a current first distance between the first sensor and the object and a current second distance between the second sensor and the object, and controlling at least one of the hand, the first finger, and the second finger to move such that a difference between the current first distance and the current second distance becomes less than or equal to a threshold value.

The control method may further include: based on receiving the distance information, determining a current first distance between the first sensor and the object and a current second distance between the second sensor and the object, and controlling a drive unit to move the robot such that a difference between the current first distance and the current second distance becomes less than or equal to a threshold value.

A first pair of distance values from among the plurality of pairs of distance values may be associated with a first point on the object, and a second pair of distance values from among the plurality of pairs of distance values may be associated with a second point on the object, and the control method may further include: measuring the first pair of distance values from among the plurality of pairs of distance values and the second pair of distance values from among the plurality of pairs of distance values while the hand moves toward the object, wherein the first pair of distance values from among the plurality of pairs of distance values is measured before the second pair of distance values from among the plurality of pairs of distance values; determining a first combined distance value based on the first pair of distance values from among the plurality of pairs of distance values; determining a second combined distance value based on the second pair of distance values from among the plurality of pairs of distance values; based on the first combined distance value being less than the second combined distance value, identifying the first point on the object as a point for gripping the object; and controlling the first finger and the second finger to grip the object on the first point on the object.

The controlling may further include: based on the second combined distance value being less than the first combined distance value, controlling the robot to move the hand toward the object; measuring a third pair of distance values from among the plurality of pairs of distance values while the hand moves toward the object, wherein the third pair of distance values is measured after the second pair of distance values and is associated with a third point on the object; determining a third combined distance value based on the third pair of distance values from among the plurality of pairs of distance values; based on the third combined distance value being greater than the second combined distance value, identifying the second point on the object as a point for gripping the object; and controlling the first finger and the second finger to grip the object on the second point on the object.

The first sensor may include a first light emitter and a first light sensor, the second sensor includes a second light emitter and a second light sensor, and the control method may further include: emitting a first light from the first light emitter; receiving through the first light sensor the first light which is reflected back to the first sensor; based on a time elapsed between the first light being emitted by the first light emitter and the first light being received by the first light sensor, determining a distance between the first sensor and the object; emitting a second light from the second light emitter; receiving through the second light sensor the second light which is reflected back to the second sensor; and based on a time elapsed between the second light being emitted by the second light emitter and the second light being received by the second light sensor, determining a distance between the second sensor and the object.

The control method may further include: determining a location of the object based on an image obtained by a camera; and controlling the robot to move toward the object.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 4 is a chart of distance information stored in a robot according to an embodiment of the disclosure;

FIG. 5 is a chart of summed-up distance values stored in a robot according to an embodiment of the disclosure;

DETAILED DESCRIPTION

Terms used in this disclosure are general terms selected in consideration of the functions described herein. However, the terms may vary depending on the intention of those skilled in the art who work in the pertinent field, legal or technical interpretations, and emergence of new technologies, etc. Also, there are some terms that were designated by the applicant on his own, and in such cases, the meaning of the terms may be interpreted in view of the meaning provided in this disclosure. If no specific definition is provided for a given term, the meaning of such term may be interpreted based on the overall content of this disclosure and technical knowledge common in the pertinent technical field.

Further, while the embodiments of the disclosure will be described in detail with reference to the following accompanying drawings and the content described in the accompanying drawings, it is not intended that the disclosure is restricted or limited by the embodiments.

Hereinafter, the disclosure will be described in detail with reference to the accompanying drawings.

Figure 1:
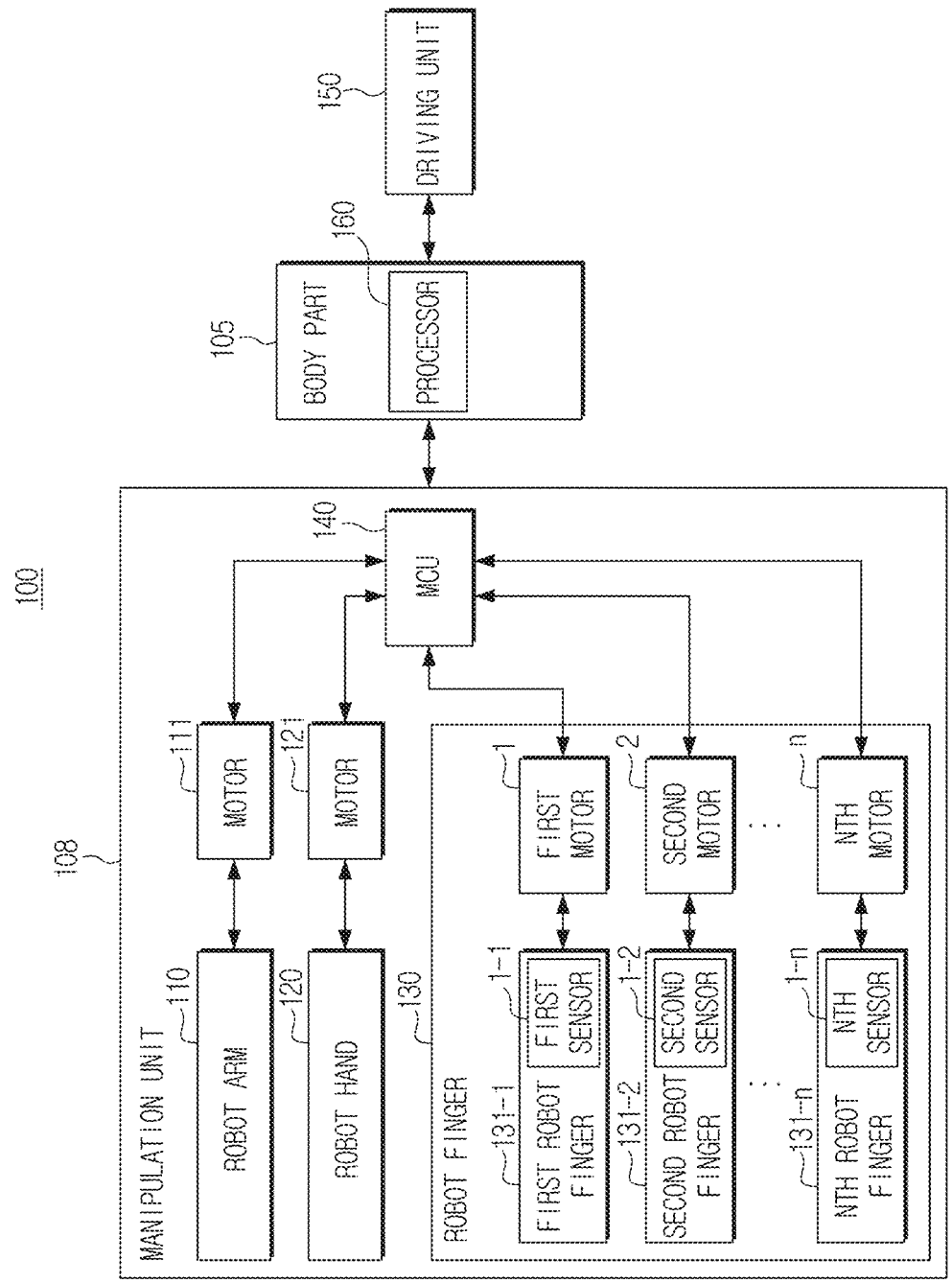
FIG. 1 is a block diagram illustrating a robot according to an embodiment of the disclosure.

FIG. 1 is a block diagram illustrating a robot according to an embodiment of the disclosure.

Referring to FIG. 1, the robot 100 according to an embodiment of the disclosure may include a body part 105 including a processor 160, a manipulation unit 108 including a robot arm 110, a robot hand 120, a robot finger 130, and a driving unit 150. Here, one end of the robot arm 110 may be connected to the body part 105 of the robot 100, and the other end of the robot arm 110 may be connected to the robot hand 120. Also, the robot finger 130 may be implemented as a plurality of robot fingers 131-1, 131-2, . . . , 131-n, and the driving unit 150 may be connected to the bottom end of the body part 105 of the robot 100 and control the movement of the robot 100.

Also, as illustrated in FIG. 1, the manipulation unit 108 of the disclosure may further include a micro controller unit (MCU) 140 and a plurality of motors. Here, the plurality of motors may include a motor 111 for controlling the robot arm 110, a motor 121 for controlling the robot hand 120, and a plurality of motors 1, 2, . . . , n for controlling each of the plurality of robot fingers 131-1, 131-2, . . . , 131-n, and each of the plurality of motors may be electronically connected with the MCU 140.

Also, the MCU 140 may be electronically connected with the processor 160 of the body part 105, and drive at least one of the plurality of motors based on a control signal received from the processor 160. As an example, if a signal for controlling the movement of the robot arm 110 is received from the processor 160, the MCU 140 may output a driving signal to the motor 111 connected to the robot arm 110, and control the movement of the robot arm 110. Also, if a signal for controlling the movement of the robot hand 120 is received from the processor 160, the MCU 140 may output a driving signal to the motor 121 connected to the robot hand 120, and control the movement of the robot hand 120.

In addition, in case a signal for controlling the movement of at least one of the plurality of robot fingers 131-1, 131-2, . . . , 131-n is received from the processor 160, the MCU 140 may output a motor driving signal for controlling the movement of the at least one robot finger to the motor corresponding to the at least one robot finger. For example, if signals for controlling the movements of the first robot finger 131-1 and the second robot finger 131-2 are received from the processor 160, the MCU 140 may output a motor driving signal for controlling the movement of the first robot finger 131-1 to a first motor 1, and output a motor driving signal for controlling the movement of the second robot finger 131-2 to a second motor 2, and thus control the movements of the first and second robot fingers 131-1 and 131-2.

Meanwhile, the MCU 140 as described above may be included in the robot arm 110, but the disclosure is not necessarily limited thereto, and the MCU 140 may also be included in the robot hand 120.

Also, the aforementioned motors may be DC motors, but the disclosure is not necessarily limited thereto, and the motors may be implemented as various motors that can generate a rotational force such as a step motor, an RC servo motor, or other similar motor.

Meanwhile, each of the plurality of robot fingers 131-1, 131-2, . . . , 131-n may include a sensor. As an example, as illustrated in FIG. 1, the first robot finger 131-1 may include a first sensor 1-1, the second robot finger 131-2 may include a second sensor 1-2, and the nth robot finger 131-n may include an nth sensor 1-n. Each of the plurality of sensors noted above may sense a distance between the sensor and an object (for example, object 200), as will be described below. Also, information on the distance sensed by each sensor may be transmitted to the MCU 140, and the MCU 140 may transmit the information on the distance received from each sensor to the processor 160. Here, the information on the distance between the sensor and an object 200 may be used in determining a point for gripping the object 200. Detailed explanation in this regard will be described below.

Hereinafter, for the convenience of explanation, the robot 100 on which the robot hand 120 including the first and second robot fingers 131-1 and 131-2 is mounted will be described. However, it can be deemed that the technical idea of the disclosure can be applied to a robot on which a robot hand including a plurality of robot fingers greater than or equal to two is mounted.

The sensor according to an embodiment of the disclosure may sense a distance between the sensor and an object 200. As an example, the sensor may be a Time-of-Flight (TOF) based sensor that includes a light emitting unit and a light receiving unit and senses a distance between the sensor and an object 200 based on the time from when a light irradiated by the light emitting unit is reflected by the object 200 to when the light is received at the light receiving unit. In this case, the sensor may sense the distance between the sensor and the object 200 based on the moving speed of the light irradiated by the light emitting unit, and an operation of the time from when the light irradiated by the light emitting unit is reflected by the object 200 to when the light is received at the light receiving unit.

The aforementioned TOF based sensor may be an infrared sensor that senses a distance to an object 200 based on the time when an infrared ray is reflected by the object 200 and is received after the infrared ray is irradiated. However, the disclosure is not necessarily limited thereto, and the sensor may be implemented as various sensors that can sense a distance from an object 200 such as an ultrasonic sensor or a LiDAR sensor. Also, the TOF based sensor is merely an example, and the sensor according to the disclosure can be any sensor if it is a sensor that can sense a distance from an object 200.

The processor 160 may cause the robot 100 for gripping an object to move. Specifically, for gripping an object 200, the processor 160 may control the driving unit 150 such that the robot 100 moves in the direction wherein the object 200 is located, or control at least one of the robot arm 110 or the robot hand 120 such that at least one of the robot arm 110 or the robot hand 120 moves in the direction wherein the object 200 is located.

To be more specific, the driving unit 150 according to the disclosure may include a driving unit implemented as wheels or robot legs, a motor, and an MCU, and the processor 160 may transmit a control signal for moving the robot 100 in the direction wherein the object 200 is located to the MCU of the driving unit 150. In this case, the MCU of the driving unit may output a driving signal to the motor connected to the driving unit according to the control signal, and move the robot 100 in the direction wherein the object 200 is located.

Alternatively, the processor 160 may transmit a control signal for moving at least one of the robot arm 110 or the robot hand 120 in the direction wherein the object 200 is located to the MCU 140 of the manipulation unit 108. In this case, the MCU 140 of the manipulation unit 108 may output a driving signal to at least one of motor 111 connected to the robot arm 110 or motor 121 connected to the robot hand 120 based on the control signal received from the processor 160, and move at least one of the robot arm 110 or the robot hand 120 in the direction wherein the object 200 is located.

That is, the processor 160 may cause at least one of the robot 100, the robot arm 110, or the robot hand 120 to move in the direction wherein the object 200 is located.

In particular, the processor 160 may cause at least one of the robot 100, the robot arm 110, or the robot hand 120 to move such that the object 200 is located between the first robot finger 131-1 and the second robot finger 131-2.

For this, the processor 160 may determine the location, the size, the form, the kind, etc. of the object 200 through analysis of an image photographed through the camera. Here, the camera is a component that can photograph objects around the robot 100, and as an example, the camera may be implemented as a 3D camera or a depth camera. Such a camera may be included in the body part 105 or the head part of the robot 100, but the disclosure is not necessarily limited thereto, and the camera may be included in various locations such as the robot arm 110, the robot hand 120, etc.

Specifically, when an image photographed through the camera is obtained, the processor 160 may recognize the object 200 included in the image through an object recognition algorithm, and thereby determine the size, the form, the kind, etc. of the object 200, and determine the location of the object 200 based on the depth information of the object 200 included in the image. Alternatively, when an image is input, the processor 160 may determine the location, the size, the form, the kind, etc. of the object 200 included in the image through an artificial intelligence model (e.g., a convolutional neural network (CNN)) trained to output the location, the size, the form, the kind, etc. of an object 200 included in an image based on the characteristic information of the image.

While at least one of the robot 100, the robot arm 110, or the robot hand 120 is moving in the direction wherein the object 200 is located, the processor 160 may sense the object 200 through one of the first sensor 1-1 or the second sensor 1-2.

Specifically, the processor 160 may activate one of the first sensor 1-1 or the second sensor 1-2, and deactivate the other sensor before the object 200 is sensed. Then, when the object 200 is sensed through the activated sensor, the processor 160 may activate the remaining deactivated sensor.

This is in consideration of the feature that, in case both of the first sensor 1-1 and the second sensor 1-2 are activated in a state wherein an object 200 does not exist between the first robot finger 131-1 and the second robot finger 131-2, the first sensor 1-1 may misrecognize an object 200 by a light irradiated by the second sensor 1-2, and the second sensor 1-2 may misrecognize an object 200 by a light irradiated by the first sensor 1-1, by an interference effect of lights.

While at least one of the robot 100, the robot arm 110, or the robot hand 120 is moving in the direction wherein the object 200 is located, the processor 160 may receive information on a plurality of distances from the activated sensor. Specifically, the information on the distances sensed by the activated sensor may be transmitted to the MCU 140 of the manipulation unit 108, and the processor 160 may receive the information on the plurality of distances sensed by the activated sensor from the MCU 140 of the manipulation unit 108.

As an example, as at least one of the robot 100, the robot arm 110, or the robot hand 120 is moving in the direction wherein the object 200 is located, as the robot hand 120 moves from the first point, to the second point, . . . , to the nth point, the processor 160 may receive information on the distance sensed by the activated sensor on the first point, information on the distance sensed by the activated sensor on the second point, . . . , and information on the distance sensed by the activated sensor on the nth point from the activated sensor.

Then, the processor 160 may determine the point wherein change in the distance occurred based on the information on the plurality of distances received from the activated sensor, and determine the point as the point wherein the object 200 was sensed.

As an example, in case the distance sensed by the activated sensor when the robot hand 120 was located on the first point and the distance sensed by the activated sensor when the robot hand 120 was located on the second point are identical, but the distance sensed by the activated sensor when the robot hand 120 was located on the third point is different from the distances sensed by the sensor on the first and second points, the processor 160 may determine the third point as the point wherein the object 200 which becomes the subject for gripping was sensed.

In this case, the processor 160 may activate the remaining inactivated sensor from the third point. This is because the subject sensed by the activated sensor on the first and second points can be deemed as the robot finger including the inactivated sensor, but not the object 200 which becomes the subject for gripping, and the subject sensed by the activated sensor on the third point can be deemed as the object 200 which becomes the subject for gripping.

As another example, while at least one of the robot 100, the robot arm 110, or the robot hand 120 is moving in the direction wherein the object 200 is located, the processor 160 may receive the information on the distances from the activated sensor, and determine a point wherein information on a distance different from the interval between the first and second robot fingers 131-1 and 131-2 is received from the sensor as the point wherein the object 200 was sensed. As an example, in case the interval between the first and second robot fingers 131-1 and 131-2 is 10 cm, the processor 160 may determine a point wherein information on a distance different from 10 cm is received from the sensor as the point wherein the object 200 was sensed. Here, the interval between the first and second robot fingers 131-1 and 131-2 is a defaulted interval, and information on this interval may be stored in the memory. Alternatively, in case at least one of the first and second robot fingers 131-1 and 131-2 was controlled for adjusting the interval between the first and second robot fingers 131-1 and 131-2, the processor 160 may determine the interval between the first and second robot fingers 131-1 and 131-2 based on the locations of the first and second robot fingers 131-1 and 131-2 changed according to the control command.

Accordingly, the processor 160 may receive information on distances from each of the plurality of activated sensors 1-1, 1-2, etc. from the point wherein the object 200 was sensed, i.e., the third point.

As another example, the processor 160 can activate the first sensor 1-1 and the second sensor 1-2 even before an object 200 is sensed, and receive information on distances from each of the first sensor 1-1 and the second sensor 1-2.

In a state wherein the robot hand 120 is located on the point wherein the first sensor 1-1 and the second sensor 1-2 are activated, i.e., on the aforementioned third point, the processor 160 may cause at least one of the robot 100, the robot arm 110, or the robot hand 120 to continue to move in the direction wherein the object 200 is located.

Accordingly, while at least one of the robot 100, the robot arm 110, or the robot hand 120 is moving in the direction wherein the object 200 is located, the processor 160 may sequentially receive information on the distance between the first sensor 1-1 and the object 200 sensed by the first sensor 1-1 from the first sensor 1-1, and sequentially receive information on the distance between the second sensor 1-2 and the object 200 sensed by the second sensor 1-2 from the second sensor 1-2.

As an example, as at least one of the robot 100, the robot arm 110, or the robot hand 120 is moving in the direction wherein the object 200 is located, in case the robot hand 120 passes through the aforementioned third point, and moves through the fourth point, the fifth point, . . . , the nth point, the processor 160 may sequentially receive information on the distance between the first sensor 1-1 and the object 200 sensed by the first sensor 1-1 on the fourth point, information on the distance between the first sensor 1-1 and the object 200 sensed by the first sensor 1-1 on the fifth point, . . . , and information on the distance between the first sensor 1-1 and the object 200 sensed by the first sensor 1-1 on the nth point from the first sensor 1-1. Likewise, the processor 160 may sequentially receive information on the distance between the second sensor 1-2 and the object 200 sensed by the second sensor 1-2 on the fourth point, information on the distance between the second sensor 1-2 and the object 200 sensed by the second sensor 1-2 on the fifth point, . . . , and information on the distance between the second sensor 1-2 and the object 200 sensed by the second sensor 1-2 on the nth point from the second sensor 1-2.

In this case, the processor 160 may determine the point wherein the distance between the first sensor 1-1 and the object 200 is minimized, based on the information on the plurality of distances received from the first sensor 1-1. Alternatively, the processor 160 may determine the point wherein the distance between the second sensor 1-2 and the object 200 is minimized, based on the information on the plurality of distances received from the second sensor 1-2.

That is, the processor 160 may determine at least one of the point wherein the distance between the first sensor 1-1 and the object 200 is minimized, or the point wherein the distance between the second sensor 1-2 and the object 200 is minimized.

Specifically, the processor 160 may determine the distance values between the first sensor 1-1 and the object 200 for the respective points, based on the information on the plurality of distances received from the first sensor 1-1 on different points.

Then, in case the distance values determined on the respective points become sequentially smaller, the processor 160 may cause at least one of the robot 100, the robot arm 110, or the robot hand 120 to continue to move in the direction wherein the object 200 is located.

As an example, while the robot hand 120 is located on the aforementioned third point, the processor 160 may determine the distance value sensed by the first sensor 1-1 on the third point, based on the information on the distance received from the first sensor 1-1. Also, in case the robot hand 120 is located on the fourth point as it moved in the direction wherein the object 200 is located from the third point, the processor 160 may determine the distance value sensed by the first sensor 1-1 on the fourth point, based on the information on the distance received from the first sensor 1-1. In addition, in case the distance value sensed by the first sensor 1-1 on the fourth point is smaller than the distance value sensed by the first sensor 1-1 on the third point, the processor 160 may cause at least one of the robot 100, the robot arm 110, or the robot hand 120 to continue to move in the direction wherein the object 200 is located. As an example, the processor 160 may cause the robot hand 120 to move from the aforementioned fourth point to the fifth point.

Then, in case the distance value that was sequentially becoming smaller becomes larger at a given point, the processor 160 may determine the distance sensed by the first sensor 1-1 at the point reached prior to the point at which the distance value increased as the minimum distance between the first sensor 1-1 and the object 200.

As an example, in the aforementioned embodiment, the processor 160 may determine the distance value sensed by the first sensor 1-1 on the fifth point based on the information on the distance received from the first sensor 1-1 while the robot hand 120 is located on the fifth point. Then, in case the distance value sensed by the first sensor 1-1 on the fifth point is greater than the distance value sensed by the first sensor 1-1 on the fourth point, the processor 160 may determine the distance sensed by the first sensor 1-1 on the fourth point as the minimum distance between the first sensor 1-1 and the object 200.

In this case, in order that the robot hand 120 is located on the fourth point, the processor 160 may cause at least one of the robot 100, the robot arm 110, or the robot hand 120 to move in an opposite direction to the direction wherein the object 200 is located.

That is, the processor 160 may control at least one of the driving unit 150, the robot arm 110, or the robot hand 120, such that the robot hand 120 moves to the point wherein the distance between the first sensor 1-1 and the object 200 is minimized.

For this, the processor 160 may store the information on the plurality of distances received from the first sensor 1-1 while at least one of the robot 100, the robot arm 110, or the robot hand 120 is moving in the direction wherein the object 200 is located. Then, while at least one of the robot 100, the robot arm 110, or the robot hand 120 is moving to an opposite direction to the direction wherein the object 200 is located, the processor 160 may receive information on the distance sensed by the first sensor 1-1 from the first sensor 1-1, and determine the point wherein the distance between the first sensor 1-1 and the object 200 becomes the aforementioned minimum distance.

Afterwards, the processor 160 may control the first and second robot fingers 131-1 and 131-2 to grip the object 200 on the aforementioned fourth point, i.e., the point wherein the distance between the first sensor 1-1 and the object 200 is minimized.

Specifically, the processor 160 may cause robot 100 to grip the object 200 by moving the first robot finger 131-1 in the direction wherein the object 200 is located as much as the distance to the object 200 sensed by the first sensor 1-1, and moving the second robot finger 131-2 in the direction wherein the object 200 is located as much as the distance to the object 200 sensed by the second sensor 1-2, on the point wherein the distance between the first sensor 1-1 and the object 200 is minimized.

Alternatively, each of the first and second robot fingers 131-1 and 131-2 may further include a tactile sensor, and the processor 160 may cause robot 100 to grip the object 200 by moving each of the first and second robot fingers 131-1 and 131-2 in the direction wherein the object 200 is located until it is sensed that the first robot finger 131-1 contacts the object 200 by the tactile sensor of the first robot finger 131-1, and it is sensed that the second robot finger 131-2 contacts the object 200 by the tactile sensor of the second robot finger 131-2.

Accordingly, the first and second robot fingers 131-1 and 131-2 may grip the object 200 on the point wherein the distance between the first sensor 1-1 and the object 200 is minimized.

Meanwhile, depending on embodiments, the processor 160 may cause at least one of the robot 100, the robot arm 110, or the robot hand 120 to move to a point wherein the object 200 is not sensed by the first sensor 1-1 anymore, and determine the point wherein the distance between the first sensor 1-1 and the object 200 is minimized based on the information on the plurality of distances received from the first sensor 1-1 between the point wherein the object 200 was initially sensed and the point wherein the object 200 is not sensed anymore.

Specifically, while at least one of the robot 100, the robot arm 110, or the robot hand 120 is moving in the direction wherein the object 200 is located, the processor 160 may receive the information on the distance from the first sensor 1-1. Then, if it is determined that the distance determined based on the information on the distance received from the first sensor 1-1 is identical to the interval between the first and second robot fingers 131-1 and 131-2 on one point, the processor 160 may determine the point as the point wherein the object 200 is not sensed anymore. Then, the processor 160 may determine the point wherein the distance between the first sensor 1-1 and the object 200 is minimized based on the information on the plurality of distances received from the first sensor 1-1 between the point wherein the object 200 was initially sensed by the first sensor 1-1 and the point wherein the object 200 is not sensed anymore. Then, the processor 160 may control the first robot finger 131-1 and the second robot finger 131-2 for gripping the object 200 on the point wherein the distance between the first sensor 1-1 and the object 200 is minimized.

Also, as described above, the processor 160 may determine the point wherein the distance between the second sensor 1-2 and the object 200 is minimized based on the information on the plurality of distances received from the second sensor 1-2. In this case, the processor 160 may grip the object 200 through the first robot finger 131-1 and the second robot finger 131-2 on the point wherein the distance between the second sensor 1-2 and the object 200 is minimized. In this case, a technical idea similar to the aforementioned technical idea is also applied, and thus detailed explanation will be omitted. As an example, in case the object 200 which becomes the subject for gripping is an object 200 in a circular form such as a cup, a tumbler, etc., the point wherein the distance between the first sensor 1-1 and the object 200 is minimized and the point wherein the distance between the second sensor 1-2 and the object 200 is minimized will be identical.

As described above, the robot 100 according to the disclosure can grip the center part of an object 200 or the thickest part of an object 200 by gripping the object 200 on the point wherein the distance between the first sensor 1-1 and the object is minimized or the point wherein the distance between the second sensor 1-2 and the object is minimized. Accordingly, the robot 100 according to the disclosure can grip the object 200 stably, and can prevent danger such as dropping the object 200, damaging the object 200, etc. that may occur by gripping the edge portion of the object 200.

FIG. 2A to FIG. 2G are diagrams for illustrating an embodiment wherein a robot according to an embodiment of the disclosure grips an object 200.

While at least one of the robot 100, the robot arm 110, or the robot hand 120 is moving in the direction wherein the object 200 is located, the processor 160 may sense the object 200 through one of the first sensor 1-1 or the second sensor 1-2.

Figure 2A:
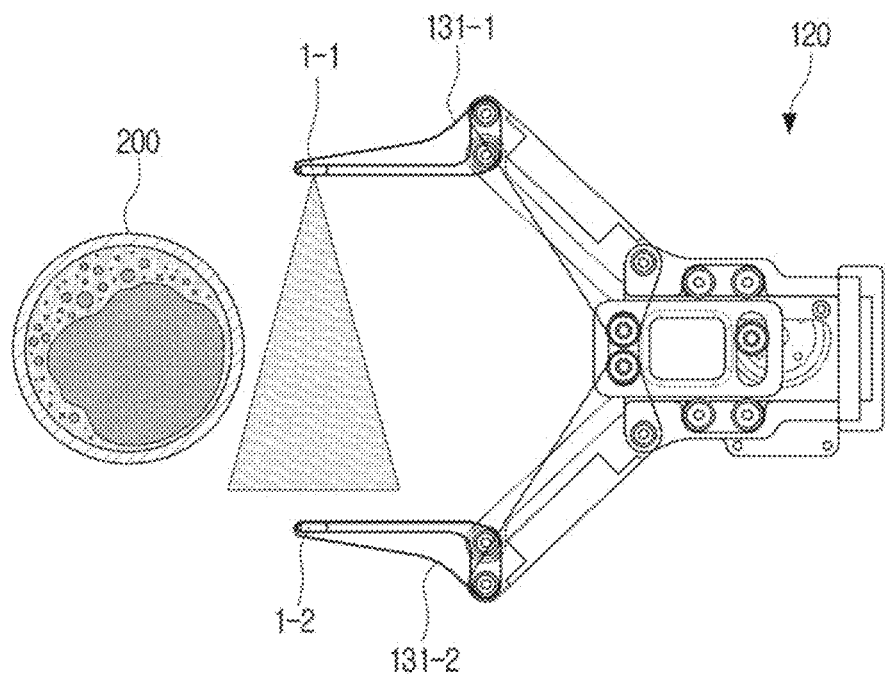
FIG. 2A is a diagram of a robotic hand according to an embodiment of the disclosure.
Figure 2B:
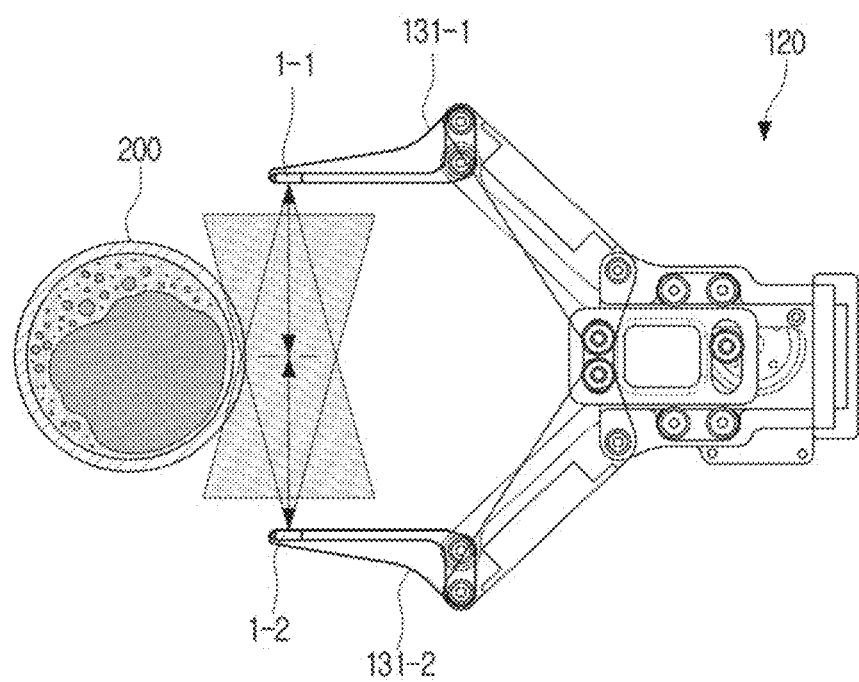
FIG. 2B is a diagram of a robotic hand configured to sense a distance from an object through first and second sensors according to an embodiment of the disclosure.

As an example, while at least one of the robot 100, the robot arm 110, or the robot hand 120 is moving in the direction wherein the object 200 is located, the processor 160 may sense the object 200 through the activated first sensor 1-1, as illustrated in FIG. 2A, and the second sensor 1-2 may be inactive until the object 200 is sensed through the first sensor 1-1.

Accordingly, the disclosure can remove an interference effect of lights that may occur in a state wherein an object 200 is not located between the first robot finger 131-1 and the second robot finger 131-2. Also, as only one sensor is activated, power consumption can be minimized, and load on the processor 160 can be prevented.

Then, if the object 200 is sensed on one point, the processor 160 may activate the remaining inactive sensor. As an example, referring to FIG. 2B, if the object 200 is sensed through the activated first sensor 1-1, the processor 160 may activate the second sensor 1-2.

Accordingly, the processor 160 may receive information on the distance between the first sensor 1-1 and the object 200 sensed by the first sensor 1-1 from the first sensor 1-1, and receive information on the distance between the second sensor 1-2 and the object 200 sensed by the second sensor 1-2 from the second sensor 1-2.

In this case, the processor 160 may determine the distance between the first sensor 1-1 and the object 200 based on the information on the distance between the first sensor 1-1 and the object 200, and determine the distance between the second sensor 1-2 and the object 200 based on the information on the distance between the second sensor 1-2 and the object 200.

Then, the processor 160 may determine whether the difference between the distance between the first sensor 1-1 and the object 200 and the distance between the second sensor 1-2 and the object 200 exceeds a threshold value. If it is determined that the difference between the distance between the first sensor 1-1 and the object 200 and the distance between the second sensor 1-2 and the object 200 exceeds the threshold value, the processor 160 may control at least one of the first and second robot fingers 131-1 and 131-2 such that the difference between the distance between the first sensor 1-1 and the object 200 and the distance between the second sensor 1-2 and the object 200 becomes smaller than or equal to the threshold value.

As an example, in case the threshold value is set as 0, the processor 160 may control at least one of the first and second robot fingers 131-1 and 131-2 such that the distance between the first sensor 1-1 and the object 200 and the distance between the second sensor 1-2 and the object 200 are identical.

This is for gripping the object 200 stably by making the first robot finger 131-1 and the second robot finger 131-2 access the object 200 simultaneously at the same speed, when gripping the object 200 afterwards.

Then, the processor 160 may cause at least one of the robot 100, the robot arm 110, or the robot hand 120 to continue to move in the direction wherein the object 200 is located.

Accordingly, while at least one of the robot 100, the robot arm 110, or the robot hand 120 is moving in the direction wherein the object 200 is located, the processor 160 may sequentially receive the information on the distance between the first sensor 1-1 and the object 200 sensed by the first sensor 1-1 from the first sensor 1-1, and sequentially receive the information on the distance between the second sensor 1-2 and the object 200 sensed by the second sensor 1-2 from the second sensor 1-2.

In this case, the processor 160 may determine the point wherein the distance between the first sensor 1-1 and the object 200 is minimized, based on the information on the plurality of distances received from the first sensor 1-1. Alternatively, the processor 160 may determine the point wherein the distance between the second sensor 1-2 and the object 200 is minimized, based on the information on the plurality of distances received from the second sensor 1-2.

Specifically, the processor 160 may determine the distance values between the first sensor 1-1 and the object 200 for the respective points based on the information on the plurality of distances received from the first sensor 1-1 on different points.

Then, in case the distance values sensed on the respective points become sequentially smaller, the processor 160 may cause at least one of the robot 100, the robot arm 110, or the robot hand 120 to continue to move in the direction wherein the object 200 is located.

Figure 2C:
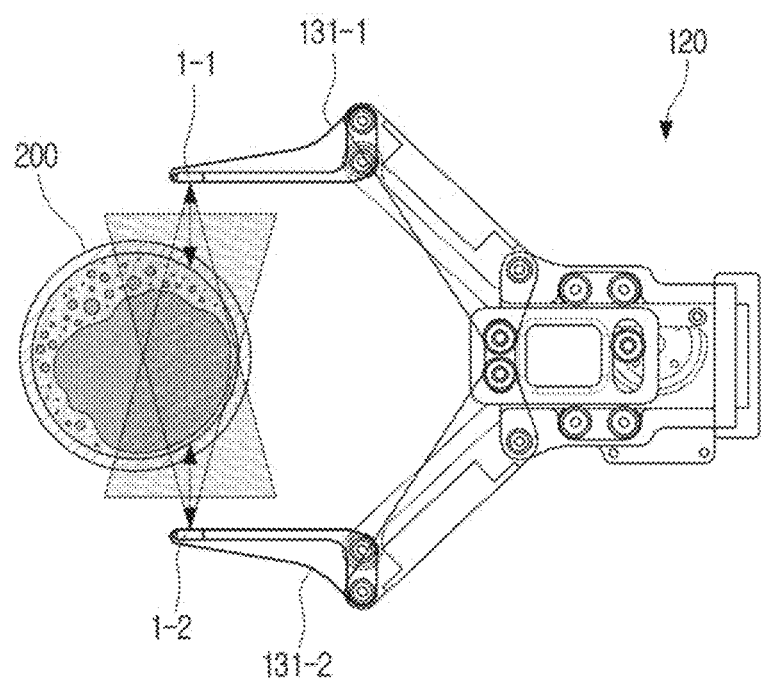
FIG. 2C is a diagram of a robot hand sensing a distance from an object on a first point according to an embodiment of the disclosure.
Figure 2D:
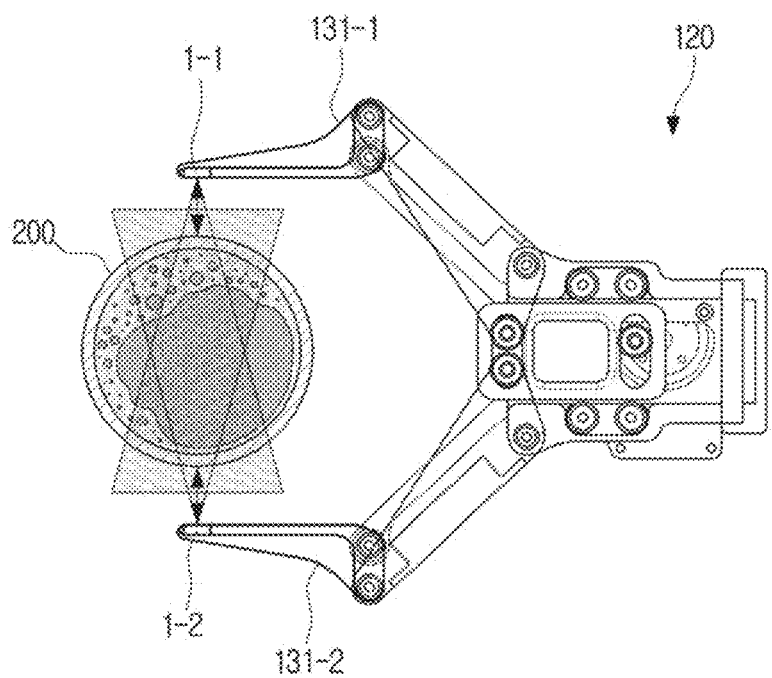
FIG. 2D is a diagram of a robot hand sensing a distance from an object on a second point according to an embodiment of the disclosure.
Figure 2E:
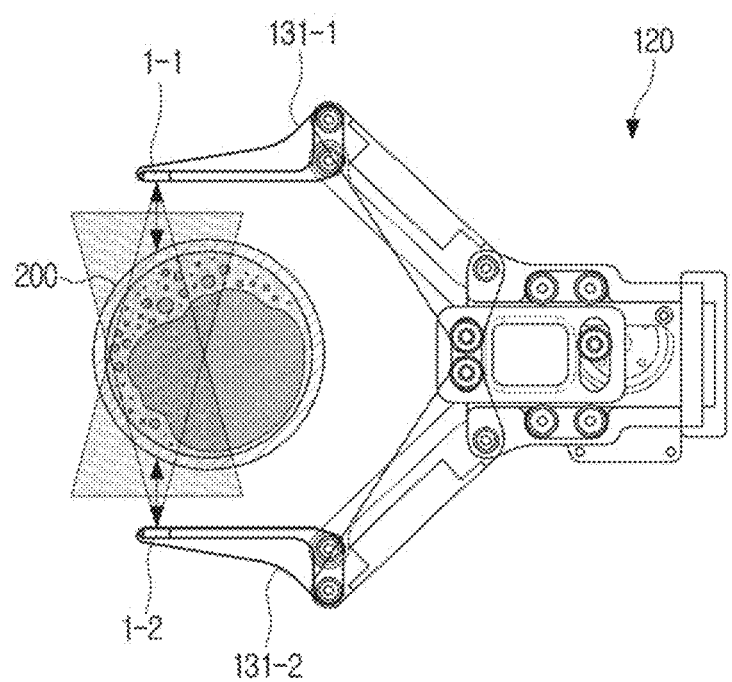
FIG. 2E is a diagram of a robot hand sensing a distance from an object on a third point according to an embodiment of the disclosure.

Referring now to FIG. 2C, FIG. 2D, and FIG. 2E, FIG. 2C is a diagram for illustrating an embodiment wherein the robot hand 120 is located on the first point, FIG. 2D is a diagram for illustrating an embodiment wherein the robot hand 120 is located on the second point, and FIG. 2E is a diagram for illustrating an embodiment wherein the robot hand 120 is located on the third point.

Referring to FIG. 2C, the processor 160 may receive information on the distance between the first sensor 1-1 and the object 200 sensed by the first sensor 1-1 on the first point when the robot hand 120 is located on the first point from the first sensor 1-1.

Then, referring to FIG. 2D, as at least one of the robot 100, the robot arm 110, or the robot hand 120 moves in the direction wherein the object 200 is located, when the robot hand 120 moves from the first point to the second point, the processor 160 may receive the information on the distance between the first sensor 1-1 and the object 200 sensed by the first sensor 1-1 on the second point from the first sensor 1-1.

Then, in case the distance value between the first sensor 1-1 and the object 200 sensed by the first sensor 1-1 on the second point is smaller than the distance value between the first sensor 1-1 and the object 200 sensed by the first sensor 1-1 on the first point, the processor 160 may cause at least one of the robot 100, the robot arm 110, or the robot hand 120 to continue to move in the direction wherein the object 200 is located.

That is, the processor 160 may cause at least one of the robot 100, the robot arm 110, or the robot hand 120 to move in the direction wherein the object 200 is located, such that the robot hand 120 is located on the third point.

Also, in case the distance value that was sequentially becoming smaller becomes larger at a given point, the processor 160 may determine that the point measured prior to moving to the point at which the distance value increased is the point wherein the distance between the first sensor 1-1 and the object 200 is minimized.

As an example, in the aforementioned embodiment, the processor 160 may determine the distance value sensed by the first sensor 1-1 on the third point based on the information on the distance received from the first sensor 1-1 while the robot hand 120 is located on the third point.

Then, in case the distance value sensed by the first sensor 1-1 on the third point is greater than the distance value sensed by the first sensor 1-1 on the second point, the processor 160 may determine that the second point is the point wherein the distance between the first sensor 1-1 and the object 200 is minimized.

Figure 2F:
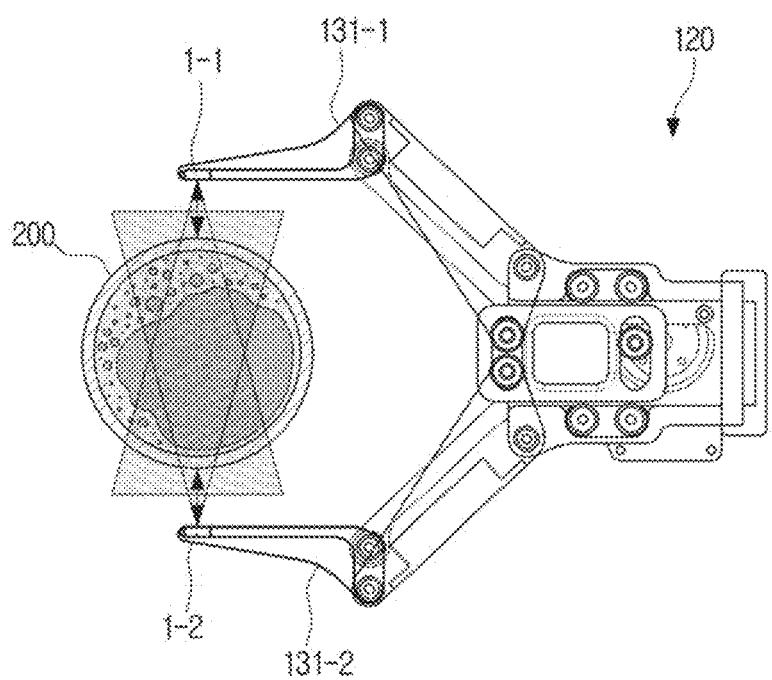
FIG. 2F is a diagram of a robot hand moving to a point wherein a distance from an object is minimum according to an embodiment of the disclosure.
Figure 2G:
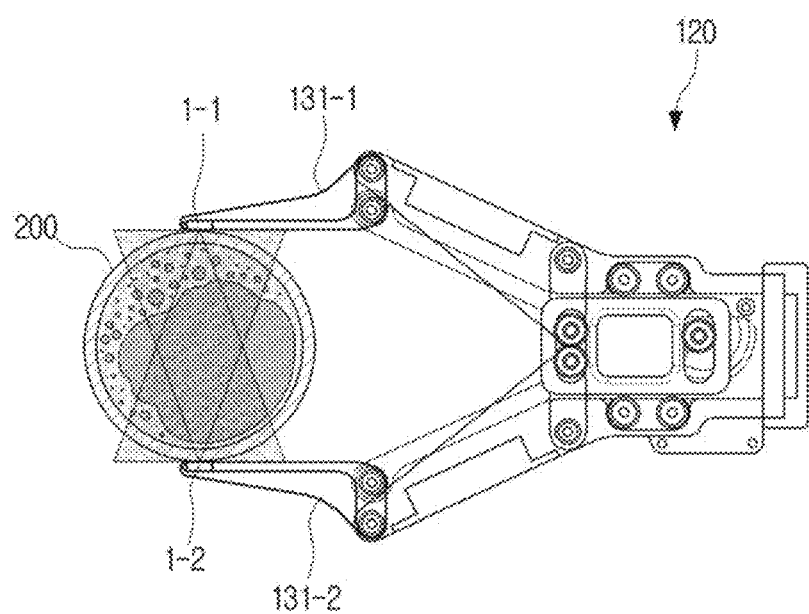
FIG. 2G is a diagram of a robot hand gripping an object on a point wherein the distance from the object is minimum according to an embodiment of the disclosure.

In this case, as illustrated in FIG. 2F, the processor 160 may control at least one of the driving unit 150, the robot arm 110, or the robot hand 120 such that the robot hand 120 is located on the second point, and as illustrated in FIG. 2G, the processor 160 may control the first and second robot fingers 131-1 and 131-2 to grip the object 200 on the second point.

That is, the processor 160 may control at least one of the driving unit 150, the robot arm 110, or the robot hand 120 such that the robot hand 120 moves to the point wherein the distance between the first sensor 1-1 and the object 200 is minimized, and control the first and second robot fingers 131-1 and 131-2 to grip the object 200 on that point.

Meanwhile, depending on embodiments, the processor 160 may cause the robot hand 120 to move to a point wherein the object 200 is not sensed by the first sensor 1-1, and determine the point wherein the distance between the first sensor 1-1 and the object 200 is minimized based on the information on the plurality of distances received from the first sensor 1-1 between the point wherein the object 200 was initially sensed and the point wherein the object 200 is not sensed anymore.

Also, as described above, the processor 160 may determine the point wherein the distance between the second sensor 1-2 and the object 200 is minimized based on the information on the plurality of distances received from the second sensor 1-2. In this case, the processor 160 may cause the object 200 to be gripped by the first robot finger 131-1 and the second robot finger 131-2 on the point wherein the distance between the second sensor 1-2 and the object 200 is minimized. In this case, a technical idea similar to the aforementioned technical idea is also applied, and thus detailed explanation will be omitted. As an example, in case the object 200 which becomes the subject for gripping is an object 200 in a circular form such as a cup, a tumbler, etc., the point wherein the distance between the first sensor 1-1 and the object 200 is minimized and the point wherein the distance between the second sensor 1-2 and the object 200 is minimized will be identical.

As described above, the robot 100 according to the disclosure can grip the center part of an object 200 or the thickest part of an object 200 by gripping the object 200 on the point wherein the distance between the first sensor 1-1 and the object 200 is minimized or the point wherein the distance between the second sensor 1-2 and the object 200 is minimized. Accordingly, the robot 100 according to the disclosure can grip the object 200 stably, and can prevent danger such as the fall, the damage, etc. of the object 200 that may occur by gripping the edge portion of the object 200.

Additionally, as noted above, in an embodiment at least one of the first and second robot fingers 131-1 and 131-2 may be controlled such that the difference between the distance between the first sensor 1-1 and the object 200 and the distance between the second sensor 1-2 and the object 200 becomes less than or equal to the threshold value, and then at least one of the robot 100, the robot arm 110, or the robot hand 120 is moved in the direction wherein the object 200 is located.

As an example, in a state wherein the difference between the distance between the first sensor 1-1 and the object 200 and the distance between the second sensor 1-2 and the object 200 exceeds the threshold value, the processor 160 may cause at least one of the robot 100, the robot arm 110, or the robot hand 120 to move in the direction wherein the object 200 is located.

Figure 3:
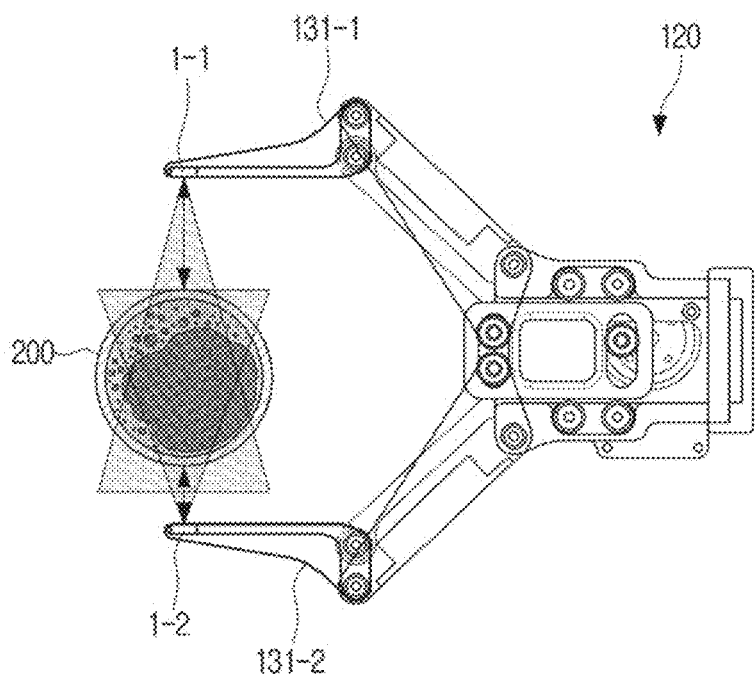
FIG. 3 is a diagram of a robot hand configured to sense a minimum distance in a state wherein a difference between a distance sensed by a first sensor and a distance sensed by a second sensor exceeds a threshold value according to an embodiment of the disclosure.

That is, as illustrated in FIG. 3, in a state wherein the difference between the distance between the first sensor 1-1 and the object 200 and the distance between the second sensor 1-2 and the object 200 exceeds the threshold value, the processor 160 may cause at least one of the robot 100, the robot arm 110, or the robot hand 120 to move in the direction wherein the object 200 is located.

In this case, while at least one of the robot 100, the robot arm 110, or the robot hand 120 is moving in the direction wherein the object 200 is located, the processor 160 may determine the minimum distance between the first sensor 1-1 and the object 200 based on the information on the plurality of distances received from the first sensor 1-1.

Then, the processor 160 may control at least one of the driving unit 150, the robot arm 110, or the robot hand 120 such that the robot hand 120 moves to the point wherein the distance between the first sensor 1-1 and the object 200 is minimized, and control the first robot finger 131-1 and the second robot finger 131-2 to grip the object 200 on said point.

Alternatively, the processor 160 may determine the minimum distance between the second sensor 1-2 and the object 200 based on the information on the plurality of distances received from the second sensor 1-2, and control the first robot finger 131-1 and the second robot finger 131-2 to grip the object 200 on said point.

FIG. 4 is a chart illustrating distance information stored in a robot according to an embodiment of the disclosure.

As described above, the processor 160 may activate one of the first sensor 1-1 or the second sensor 1-2, and deactivate the remaining one until an object 200 is sensed. Then, when an object 200 is sensed through the activated sensor, the processor 160 may activate the remaining deactivated sensor, and receive information on a plurality of distances from the activated first and second sensors 1-1 and 1-2 while the robot hand 120 is passing through a plurality of points.

Then, the processor 160 may store the information on the distances received from the sensors in the memory (e.g., memory 170).

Specifically, the processor 160 may store at least one of the information on the distances received from the first sensor 1-1 or the information on the distances received from the second sensor 1-2 for the respective points wherein the robot hand 120 is located in the memory.

As an example, referring to FIG. 4, while at least one of the robot 100, the robot arm 110, or the robot hand 120 is moving in the direction wherein the object 200 is located, the processor 160 may receive the information on the distance sensed by the first sensor from the activated first sensor. Here, the distance sensed by the first sensor on the points before the object 200 was sensed may become the distance between the first sensor 1-1 and the second sensor 1-2. As an example, if the distance between the first sensor 1-1 and the second sensor 1-2 is 100 mm, the distance sensed by the first sensor 1-1 may be 100 mm on the first and second points which are points before the object 200 was sensed, as illustrated in FIG. 4. In this case, the processor 160 may match 100 mm to each of the first and second points, and store it.

Then, as at least one of the robot 100, the robot arm 110, or the robot hand 120 continues to move in the direction wherein the object 200 is located, in case the distance sensed by the first sensor on the third point becomes different from the distance between the first sensor 1-1 and the second sensor 1-2, the processor 160 may activate the second sensor 1-2 on the third point, and receive information on the distance from each of the first and second sensors 1-1 and 1-2. Then, on the third point, the processor 160 may match the distance sensed by each of the first and second sensors 1-1 and 1-2 to the third point, and store them. As an example, if the distance sensed by each of the first and second sensors 1-1 and 1-2 on the third point is 97 mm, the processor 160 may match the distance 97 mm to the third point and store it, as illustrated in FIG. 4.

Then, the processor 160 may cause at least one of the robot 100, the robot arm 110, or the robot hand 120 to continue to move in the direction wherein the object 200 is located, and accordingly, sequentially receive information on the distance between the first sensor 1-1 and the object 200 sensed by the first sensor 1-1 from the first sensor 1-1, and sequentially receive information on the distance between the second sensor 1-2 and the object 200 sensed by the second sensor 1-2 from the second sensor 1-2. Then, the processor 160 may store the distance sensed by each of the first and second sensors 1-1 and 1-2 for each of the plurality of points.

As an example, if the robot hand 120 passes through the third point, the fourth point and the fifth point, and the distance sensed by each of the first and second sensors 1-1 and 1-2 on the fourth point is 95 mm, the processor 160 may match the distance 95 mm to the fourth point and store it, as illustrated in FIG. 4, and if the distance sensed by each of the first and second sensors 1-1 and 1-2 on the fifth point is 93 mm, the processor 160 may match the distance 93 mm to the fifth point and store it.

Then, in case the distance sensed by the sensor on the fourth point is greater than the distance sensed by the sensor on the fifth point, the processor 160 may cause at least one of the robot 100, the robot arm 110, or the robot hand 120 to continue to move in the direction wherein the object 200 is located.

Accordingly, in case the robot hand 120 passes through the sixth point, the processor 160 may match the distance sensed by each of the first and second sensors 1-1 and 1-2 on the sixth point to the sixth point, and store it. As an example, in case the distance sensed by each of the first and second sensors 1-1 and 1-2 on the sixth point is 95 mm, the processor 160 may match the distance 95 mm to the sixth point and store it, as illustrated in FIG. 4.

Then, in case the distance sensed by the sensor on the fifth point is less than the distance sensed by the sensor on the sixth point, the processor 160 may cause at least one of the robot 100, the robot arm 110, or the robot hand 120 to move in an opposite direction to the direction wherein the object 200 is located.

Specifically, the processor 160 may determine the point wherein the distance between the sensor and the object 200 is minimized based on the information to which the information on the distance sensed by the sensor is matched, for each point wherein the robot hand 120 is located, and move the robot hand 120 to such point. As an example, in case the distance information as in FIG. 4 is stored in the memory, the processor 160 may cause the robot hand 120 to move to the fifth point.

Afterwards, on the aforementioned fifth point (i.e., on the point wherein the distance between the first sensor 1-1 and the object 200 is minimized), the processor 160 may control the first and second robot fingers 131-1 and 131-2 to grip the object 200.

FIG. 5 is a chart illustrating summed-up distance values (combined distance values) stored in a robot according to an embodiment of the disclosure.

As described above, the processor 160 may cause the object 200 to be gripped at the point wherein the distance sensed by the first sensor 1-1 is minimized or the point wherein the distance sensed by the second sensor 1-2 is minimized.

In an embodiment, the processor 160 may cause the object 200 to be gripped at the point wherein the sum of the distances (combined distance value) sensed by the first and second sensors 1-1 and 1-2 is minimized.

For this, the processor 160 may store in memory the sum of the distance (combined distance value) sensed by the first sensor 1-1 and the distance sensed by the second sensor 1-2 for each point wherein the robot hand 120 is located.

As an example, referring to FIG. 5, only the first sensor 1-1 is activated on the first and second points which are the points before an object 200 is sensed, and thus the processor 160 may store 100 mm which is the distance sensed by the first sensor 1-1 as the combined distance value of the first point.

Then, as at least one of the robot 100, the robot arm 110, or the robot hand 120 moves in the direction wherein the object 200 is located, if an object 200 is sensed on the third point, the processor 160 may activate the second sensor 1-2 and receive information on the distance from each of the first and second sensors 1-1 and 1-2. Then, on the third point, the processor 160 may match the sum of the distances sensed by each of the first and second sensors 1-1 and 1-2 to the third point, and store it. As an example, where the sum of the distances sensed by each of the first and second sensors 1-1 and 1-2 (combined distance value) on the third point is 194 mm, the processor 160 may match the distance 194 mm to the combined distance value of the third point and store it, as illustrated in FIG. 5.

Then, the processor 160 may cause at least one of the robot 100, the robot arm 110, or the robot hand 120 to continue to move in the direction wherein the object 200 is located, and accordingly, sequentially receive the information on the distance between the first sensor 1-1 and the object 200 sensed by the first sensor 1-1 from the first sensor 1-1, and sequentially receive the information on the distance between the second sensor 1-2 and the object 200 sensed by the second sensor 1-2 from the second sensor 1-2. Then, the processor 160 may store the sum of the distances sensed by each of the first and second sensors 1-1 and 1-2 for each of the plurality of points.

As an example, if the robot hand 120 passes through the third point, the fourth point and the fifth point, and the distance sensed by each of the first and second sensors 1-1 and 1-2 on the fourth point is 95 mm, the processor 160 may store the distance 190 mm which is sum of the distances sensed by each of the first and second sensors 1-1 and 1-2 on the fourth point as the combined distance value of the fourth point, as illustrated in FIG. 5. And if the distance sensed by each of the first and second sensors 1-1 and 1-2 on the fifth point is 93 mm, the processor 160 may store the distance 186 mm which is the sum of the distances sensed by each of the first and second sensors 1-1 and 1-2 on the fifth point as the combined distance value of the fifth point.

Then, in case the combined distance value of the fourth point is greater than the combined distance value of the fifth point, the processor 160 may cause at least one of the robot 100, the robot arm 110, or the robot hand 120 to continue to move in the direction wherein the object 200 is located.

Accordingly, in case the robot hand 120 passes through the sixth point, the processor 160 may store the sum of the distances sensed by each of the first and second sensors 1-1 and 1-2 on the sixth point as the combined distance value of the sixth point. As an example, if the distance sensed by each of the first and second sensors 1-1 and 1-2 on the sixth point is 95 mm, the processor 160 may store 190 mm as the combined distance value of the sixth point, as illustrated in FIG. 5.

Then, in case the combined distance value of the fifth point is less than the combined distance value of the sixth point, the processor 160 may cause at least one of the robot 100, the robot arm 110, or the robot hand 120 to move in an opposite direction to the direction wherein the object 200 is located.

Specifically, the processor 160 may determine the point wherein the combined distance value is minimized among the plurality of points based on the information to which the sum of the distances sensed by the sensors is matched, for the respective points wherein the robot hand 120 is located, and move the robot hand 120 to such point. As an example, in case the distance information as in FIG. 5 is stored in the memory, the processor 160 may cause the robot hand 120 to move to the fifth point.

Afterwards, on the aforementioned fifth point (i.e., on the point wherein the distance between the first sensor 1-1 and the object 200 is minimized), the processor 160 may control the first and second robot fingers 131-1 and 131-2 to grip the object 200.

Figure 6:
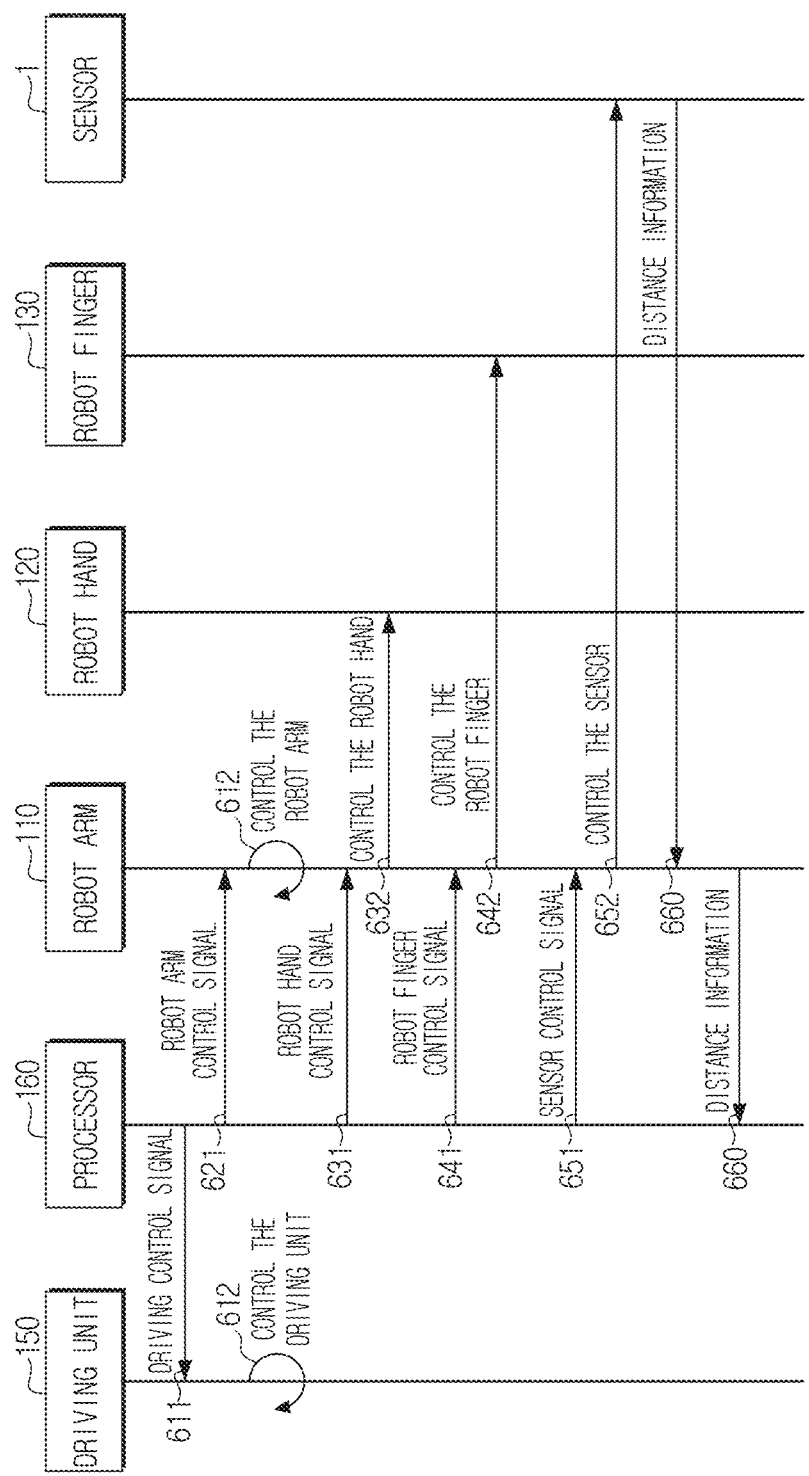
FIG. 6 is a sequence diagram illustrating a control method for a robot according to an embodiment of the disclosure.

FIG. 6 is a sequence diagram illustrating a control method for a robot according to an embodiment of the disclosure.

The processor 160 may be electronically connected with the various components included in the robot 100, and control each such component.

As an example, the processor 160 may be electronically connected with a micro controller unit (MCU) included in the driving unit 150, and as illustrated in FIG. 6, the processor 160 may transmit a signal 611 for driving of the driving unit to the MCU of the driving unit 150. In this case, the MCU of the driving unit 150 may control the motor connected with the operation unit of the driving unit 150 according to the driving control signal 611 received from the processor 160. As an example, the operation unit may be implemented as wheels or the robot's legs, etc., and the MCU of the driving unit 150 may control the motor connected with the operation unit according to the driving control signal 611, and thereby control the driving operations of the robot 100 such as moving, stopping, shifting of directions, etc.

Also, the processor 160 may be electronically connected with the MCU included in the robot arm 110, and as illustrated in FIG. 6, the processor 160 may transmit a signal 621 for controlling the robot arm, a signal 631 for controlling the robot hand, a signal 641 for controlling the robot finger, and a signal 651 for controlling the sensor to the MCU included in the robot arm 110.

In this case, if the signal 621 for controlling the robot arm is received from the processor 160, the MCU included in the robot arm 110 may control (612) the movement of the robot arm 110 by outputting a driving signal to the motor connected with the robot arm 110 according to the robot arm control signal 621, and if the signal 631 for controlling the robot hand is received from the processor 160, the MCU may control (632) the movement of the robot arm 120 by outputting a driving signal to the motor connected with the robot arm 120 according to the robot hand control signal 631, and if the signal 641 for controlling the robot finger is received from the processor 160, the MCU may control (642) the movement of the robot finger 130 by outputting a driving signal to the motor connected with the robot finger 130 according to the robot finger control signal 641.

Also, if the signal 651 for controlling the sensor is received from the processor 160, the MCU included in the robot arm 110 may activate or deactivate the sensor 1 according to the sensor control signal 651.

Meanwhile, here, it was described that the MCU is included in the robot arm 110, but this is merely an example, and the MCU may be included in the body part 105 or the robot hand 120 of the robot 100.

Meanwhile, the sensor 1 may sense a distance from the sensor 1 to an object 200. Then, the sensor 1 may transmit information 660 on the sensed distance to the MCU included in the robot arm 110, and the MCU may transmit the information 660 on the distance received from the sensor 1 to the processor 160. Here, the information on the distance between the sensor and the object 200 may be used in determining a point for gripping the object 200, as described above.

Figure 7:
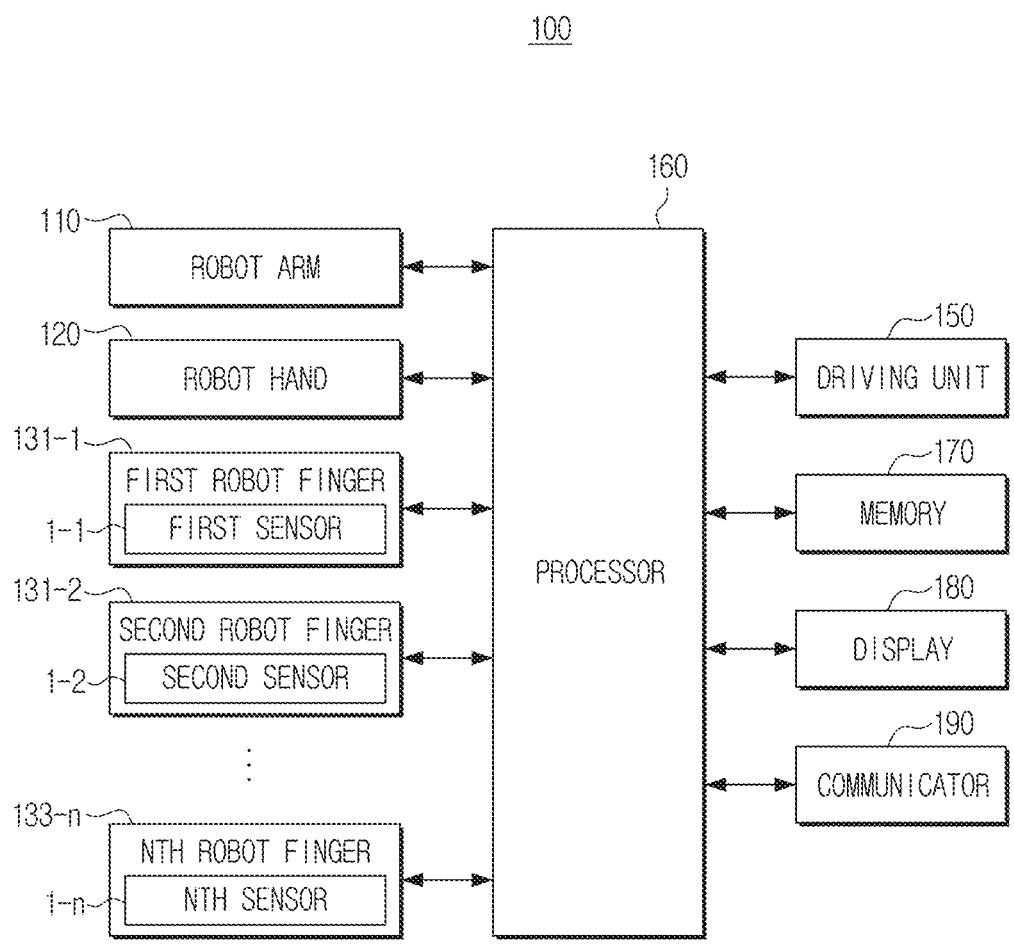
FIG. 7 is a block diagram for illustrating a robot according to an embodiment of the disclosure.

FIG. 7 is a block diagram for illustrating a robot according to an embodiment of the disclosure.

Referring to FIG. 7, the robot 100 according to an embodiment of the disclosure may include a robot arm 110, a robot hand 120, a plurality of robot fingers 131-1, 131-2, . . . , 131-n, a driving unit 150, a memory 170, a display 180, a communicator 190, and a processor 160. Also, the plurality of respective robot fingers 131-1, 131-2, . . . , 131-n may include sensors 1-1, 1-2, . . . , 1-n for sensing a distance from an object 200. Hereinafter, explanation regarding parts overlapping with the aforementioned explanation will be omitted or abridged.

The memory 170 may store an operating system (OS) for controlling the overall operations of the components of the robot 100, and instructions or data related to the components of the robot 100.

Accordingly, the processor 160 may control a plurality of hardware or software components of the robot 100 by using various instructions or data stored in the memory 170, and load instructions or data received from at least one of other components on a volatile memory and process them, and store various data in a non-volatile memory.

In particular, the memory 170 may store information on distances received from the sensors, for the respective points wherein the robot hand 120 is located. Also, the memory 170 may store values of summing up the distances sensed by the plurality of sensors, for the respective points wherein the robot hand 120 is located.

The display 180 may display various screens. For example, the display 180 may display information on the distances between an object and an object around the robot 100.

Such a display 180 may be implemented as displays in various forms such as a liquid crystal display (LCD), a plasma display panel (PDP), etc. In the display 180, driving circuits that may be implemented in forms such as an a-si TFT, a low temperature poly silicon (LTPS) TFT, an organic TFT (OTFT), etc., a backlight unit, etc. may also be included together. Meanwhile, the display 180 may be combined with a touch sensing unit, and implemented as a touch screen.

The communicator 190 is a component performing communication with external devices. For example, the communicator 190 may perform communication with various external devices through a wireless communication method such as Bluetooth (BT), Bluetooth Low Energy (BLE), Wireless Fidelity (WI-FI), Zigbee, etc., or an infrared (IR) communication method. Meanwhile, the communicator 190 can obviously be mounted on the processor 160, and it can also be included in the robot 100 as a separate component from the processor 160.

The processor 160 controls the overall operations of the robot 100. For this, the processor 160 may include a central processing unit (CPU) or an application processor (AP). Alternatively, the processor 160 may be implemented as at least one general processor, a digital signal processor, an application specific integrated circuit (ASIC), a system on chip (SoC), a microcomputer (MICOM), a driver IC, etc.

Meanwhile, the aforementioned components are merely examples, and the robot 100 may be implemented while some components among the plurality of aforementioned components are excluded, or may be implemented while further including additional components other than the aforementioned plurality of components.

As an example, the robot 100 may further include a speaker. The speaker is a component outputting various kinds of audio data for which various processing works such as decoding or amplification, and noise filtering were performed by an audio processor (not shown). According to an embodiment of the disclosure, the speaker may output a sound when the robot 100 grips an object 200.

Also, the robot 100 may further include a microphone. The microphone may receive a user voice. Here, the user voice may be a user voice for executing a task of the robot 100, etc.

In addition, the robot 100 may further include an input unit. The input unit is a component receiving a user input, and for example, it may be a button or a touch screen.

Figure 8:
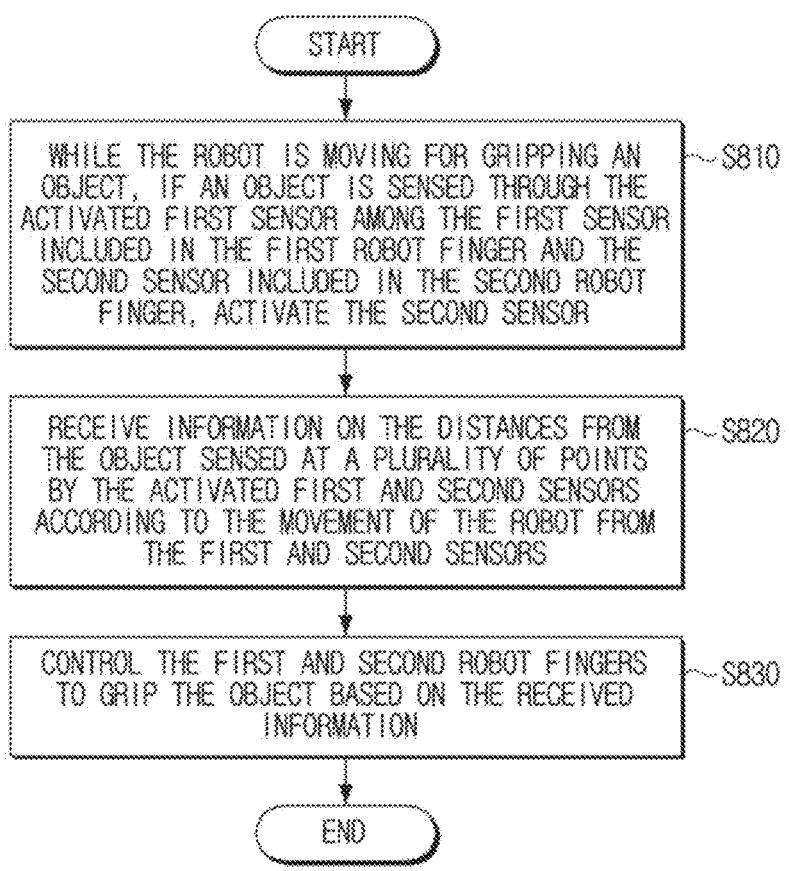
FIG. 8 is a flow chart illustrating an operation of a robot according to an embodiment of the disclosure.

FIG. 8 is a flow chart illustrating an operation of a robot according to an embodiment of the disclosure.

While the robot 100 is moving for the purpose of gripping an object 200, when an object 200 is sensed through the activated first sensor among the first sensor included in the first robot finger and the second sensor included in the second robot finger, the robot 100 may activate (S810) the second sensor.

Specifically, the robot 100 may activate one of the first sensor or the second sensor before an object 200 is sensed, and deactivate the remaining one. Then, when an object 200 is sensed through the activated sensor, the robot 100 may activate the remaining deactivated sensor.

Then, the robot 100 may receive (S820) information on the distances from the object 200 sensed at a plurality of points by the activated first and second sensors according to the movement of the robot 100 from the activated first and second sensors.

Specifically, the robot 100 may control at least one of the driving unit, the robot arm, or the robot hand such that the robot 100 moves in the direction wherein the object 200 is located, and while the robot hand passes through the plurality of points in accordance thereto, the robot 100 may receive information on the distances sensed by each of the first and second sensors from the first and second sensors.

Then, the robot 100 may store in the memory the distance sensed by the first sensor 1-1 and the distance sensed by the second sensor 1-2 for each point wherein the robot hand 120 is located.

Alternatively, the robot 100 may store the value of summing up the distances sensed by the first and second sensors 1-1 and 1-2 for each point wherein the robot hand 120 is located in the memory.

Then, the robot 100 may control (S830) the first and second robot fingers to grip the object 200 based on the information received from the sensors.

Specifically, based on the distance information stored in the memory, the robot 100 may control the first and second robot fingers to grip the object 200 on the point wherein the distance sensed by the first sensor is minimized, or on the point wherein the distance sensed by the second sensor is minimized.

Alternatively, the robot 100 may control the first and second robot fingers to grip the object 200 on the point wherein the value of summing up the distances sensed by the first and second sensors is minimized.

Meanwhile, the methods according to the aforementioned various embodiments of the disclosure may be implemented in forms of software or applications that can be installed on conventional robots.

Also, the methods according to the aforementioned various embodiments of the disclosure may be implemented just with software upgrade, or hardware upgrade of conventional robots.

Meanwhile, a non-transitory computer readable medium storing a program sequentially executing the control method for a robot according to the disclosure can be provided.

Meanwhile, a non-transitory computer readable medium refers to a medium that stores data semi-permanently, and is readable by machines, but not a medium that stores data for a short moment such as a register, a cache, and a memory. Specifically, the aforementioned various applications or programs may be provided while being stored in a non-transitory computer readable medium such as a CD, a DVD, a hard disk, a blue-ray disk, a USB, a memory card, a ROM and the like.

Also, while preferred embodiments of the disclosure have been shown and described, the disclosure is not limited to the aforementioned specific embodiments, and it is apparent that various modifications may be made by those having ordinary skill in the technical field to which the disclosure belongs. Further, it is intended that such modifications are not to be interpreted independently from the technical idea or prospect of the disclosure.

What is claimed is:

1. A robot comprising:
   a hand comprising a first finger and a second finger, wherein the first finger comprises a first sensor and the second finger comprises a second sensor;
   memory storing one or more instructions; and
   at least one processor configured to execute the one or more instructions,
   wherein the one or more instructions, when executed by the at least one processor, cause the robot to:
   based on sensing an object through the first sensor while the robot is moving to grip the object, activate the second sensor,
   receive, from the first sensor and the second sensor, distance information comprising a plurality of pairs of distance values, wherein each respective pair of distance values of the plurality of pairs of distance values comprises a first distance between the first sensor and the object and a second distance between the second sensor and the object, and each respective pair of distance values of the plurality of pairs of distance values corresponds to a respective position of the hand relative to the object,
   for each respective pair of distance values of the plurality of pairs of distance values, determine a combined distance value by adding the first distance of the respective pair of distance values to the second distance of the respective pair of distance values, to obtain a plurality of combined distance values,
   determine a minimum combined distance value among the plurality of combined distance values,
   control the robot to move the hand to a position corresponding to the minimum combined distance value, and
   control the first finger and the second finger to grip the object.

2. The robot of claim 1,
   wherein the robot further comprises a drive unit, and
   wherein the one or more instructions, when executed by the at least one processor, cause the robot to:
   based on receiving the distance information, determine a current first distance between the first sensor and the object and a current second distance between the second sensor and the object, and
   control the drive unit to move the robot such that a difference between the current first distance and the current second distance becomes less than or equal to a threshold value.

3. The robot of claim 1,
   wherein the first sensor comprises a first light emitter and a first light sensor, and the second sensor comprises a second light emitter and a second light sensor,
   wherein the first sensor is configured to emit a first light through the first light emitter, to receive through the first light sensor the first light emitted by the first light emitter which is reflected back to the first sensor, and based on a time elapsed between the first light being emitted by the first light emitter and the first light being received by the first light sensor, to determine a distance between the first sensor and the object, and wherein the second sensor is configured to emit a second light through the second light emitter, to receive through the second light sensor the second light emitted by the second light emitter which is reflected back to the second sensor, and based on a time elapsed between the second light being emitted by the second light emitter and the second light being received by the second light sensor, to determine a distance between the second sensor and the object.

4. The robot of claim 1, further comprising a camera, wherein the one or more instructions, when executed by the at least one processor, cause the robot to:
   determine a location of the object based on an image obtained by the camera, and
   move the robot toward the object.

5. A robot comprising:
   a hand comprising a first finger and a second finger, wherein the first finger comprises a first sensor and the second finger comprises a second sensor;
   memory storing one or more instructions; and
   at least one processor configured to execute the one or more instructions,
   wherein the one or more instructions, when executed by the at least one processor, cause the robot to:
     based on sensing an object through the first sensor while the robot is moving to grip the object, activate the second sensor,
     receive, from the first sensor and the second sensor, distance information comprising a plurality of pairs of distance values, wherein each respective pair of distance values of the plurality of pairs of distance values comprises a first distance between the first sensor and the object and a second distance between the second sensor and the object, and each respective pair of distance values of the plurality of pairs of distance values corresponds to a respective position of the hand relative to the object,
   wherein a first pair of distance values from among the plurality of pairs of distance values is associated with a first point on the object, and a second pair of distance values from among the plurality of pairs of distance values is associated with a second point on the object,
   wherein the first pair of distance values and the second pair of distance values are measured while the hand moves toward the object,
   wherein the first pair of distance values is measured before the second pair of distance values, and
   wherein the one or more instructions, when executed by the at least one processor, cause the robot to:
     determine a first combined distance value based on the first pair of distance values,
     determine a second combined distance value based on the second pair of distance values,
     based on the first combined distance value being less than the second combined distance value, identify the first point on the object as a point for gripping the object, and
     control the first finger and the second finger to grip the object on the first point on the object.

6. The robot of claim 5, wherein the one or more instructions, when executed by the at least one processor, cause the robot to:
   based on the second combined distance value being less than the first combined distance value, control the robot to move the hand toward the object,
   receive a third pair of distance values from among the plurality of pairs of distance values, wherein the third pair of distance values is measured while the hand moves toward the object, is measured after the second pair of distance values, and is associated with a third point on the object,
   determine a third combined distance value based on the third pair of distance values from among the plurality of pairs of distance values,
   based on the third combined distance value being greater than the second combined distance value, identify the second point on the object as a point for gripping the object, and
   control the first finger and the second finger to grip the object on the second point on the object.

7. A control method for a robot comprising a hand, the hand comprising a first finger and a second finger, the first finger comprising a first sensor, and the second finger comprising a second sensor, the control method comprising:
   based on sensing an object through the first sensor while the robot is moving to grip the object, activating the second sensor;
   receiving, from the first sensor and the second sensor, distance information comprising a plurality of pairs of distance values, wherein each respective pair of distance values of the plurality of pairs of distance values comprises a first distance between the first sensor and the object and a second distance between the second sensor and the object, and wherein each respective pair of distance values of the plurality of pairs of distance values corresponds to a respective position of the hand relative to the object;
   for each respective pair of distance values of the plurality of pairs of distance values, determining a combined distance value by adding the first distance of the respective pair of distance values to the second distance of the respective pair of distance values, to obtain a plurality of combined distance values;
   determining a minimum combined distance value among the plurality of combined distance values;
   controlling the robot to move the hand to a position corresponding to the minimum combined distance value; and
   controlling the first finger and the second finger to grip the object.

8. The control method of claim 7, further comprising:
   based on receiving the distance information, determining a current first distance between the first sensor and the object and a current second distance between the second sensor and the object, and
   controlling a drive unit to move the robot such that a difference between the current first distance and the current second distance becomes less than or equal to a threshold value.

9. The control method of claim 7,
   wherein a first pair of distance values from among the plurality of pairs of distance values is associated with a first point on the object, and a second pair of distance values from among the plurality of pairs of distance values is associated with a second point on the object, and
   wherein the control method further comprises:
     measuring the first pair of distance values from among the plurality of pairs of distance values and the second pair of distance values from among the plurality of pairs of distance values while the hand moves toward the object, wherein the first pair of distance values from among the plurality of pairs of distance values is measured before the second pair of distance values from among the plurality of pairs of distance values;

determining a first combined distance value based on the first pair of distance values from among the plurality of pairs of distance values;

determining a second combined distance value based on the second pair of distance values from among the plurality of pairs of distance values;

based on the first combined distance value being less than the second combined distance value, identifying the first point on the object as a point for gripping the object; and controlling the first finger and the second finger to grip the object on the first point on the object.

10. The control method for a robot of claim 9, wherein the controlling further comprises:

based on the second combined distance value being less than the first combined distance value, controlling the robot to move the hand toward the object;

measuring a third pair of distance values from among the plurality of pairs of distance values while the hand moves toward the object, wherein the third pair of distance values is measured after the second pair of distance values and is associated with a third point on the object;

determining a third combined distance value based on the third pair of distance values from among the plurality of pairs of distance values;

based on the third combined distance value being greater than the second combined distance value, identifying the second point on the object as a point for gripping the object; and controlling the first finger and the second finger to grip the object on the second point on the object.

11. The control method for a robot of claim 7, wherein the first sensor comprises a first light emitter and a first light sensor, the second sensor comprises a second light emitter and a second light sensor, and wherein the control method further comprises:

emitting a first light from the first light emitter;

receiving through the first light sensor the first light which is reflected back to the first sensor;

based on a time elapsed between the first light being emitted by the first light emitter and the first light being received by the first light sensor, determining a distance between the first sensor and the object;

emitting a second light from the second light emitter;

receiving through the second light sensor the second light which is reflected back to the second sensor; and based on a time elapsed between the second light being emitted by the second light emitter and the second light being received by the second light sensor, determining a distance between the second sensor and the object.

12. The control method for a robot of claim 7, further comprising:

determining a location of the object based on an image obtained by a camera; and controlling the robot to move toward the object.

* * * * *